(12) United States Patent
Kamalanathan et al.

(10) Patent No.: US 7,093,248 B2
(45) Date of Patent: Aug. 15, 2006

(54) METHOD AND SYSTEM FOR TARGETING ALERTS TO INFORMATION HANDLING SYSTEMS

(75) Inventors: Chandar Kamalanathan, Austin, TX (US); Tim W. Cox, Austin, TX (US); Fabiano De Souza, Austin, TX (US); Junaid Ghaffar, Austin, TX (US); Keith Hester, Austin, TX (US); Micah Wiseley, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 630 days.

(21) Appl. No.: 10/350,877

(22) Filed: Jan. 24, 2003

(65) Prior Publication Data

US 2004/0148599 A1     Jul. 29, 2004

(51) Int. Cl.
*G06F 9/45* (2006.01)
(52) U.S. Cl. ...................................... 717/174
(58) Field of Classification Search ................. 717/174
See application file for complete search history.

(56) References Cited

U.S. PATENT DOCUMENTS

| 6,256,668 | B1 * | 7/2001 | Slivka et al. ............... 709/220 |
| 6,327,617 | B1 * | 12/2001 | Fawcett ....................... 709/219 |
| 6,353,926 | B1 * | 3/2002 | Parthesarathy et al. ..... 717/170 |
| 6,477,667 | B1 * | 11/2002 | Levi et al. ..................... 714/57 |
| 6,565,608 | B1 * | 5/2003 | Fein et al. ................. 715/501.1 |
| 6,721,740 | B1 * | 4/2004 | Skinner et al. ................ 707/10 |
| 6,895,401 | B1 * | 5/2005 | Skinner et al. ................. 707/1 |
| 2003/0167354 | A1 * | 9/2003 | Peppers et al. ............. 709/327 |
| 2003/0208577 | A1 * | 11/2003 | Grigsby ....................... 709/223 |
| 2004/0044693 | A1 * | 3/2004 | Hadley et al. .............. 707/200 |

* cited by examiner

*Primary Examiner*—John Chavis
(74) *Attorney, Agent, or Firm*—Hamilton & Terrile, LLP; Robert W. Holland

(57) ABSTRACT

Alerts are targeted for display at an information handling system by associating conditions with alerts and downloading for display an alert only to information handling systems that meet the conditions of the alert. An alert list that includes alerts and associated conditions in an Extensible Mark-up Language file is periodically queried for retrieval at information handling systems and parsed to determine alerts targeted to the information handling system. Only relevant alerts are downloaded and displayed at each information handling system to minimize user distraction. Specific targeting is provided by logical expressions that may state conditional alert configuration parameters with precision to limit the number of information handling systems targeted for the alert to very specific configurations.

20 Claims, 2 Drawing Sheets

METHOD AND SYSTEM FOR TARGETING ALERTS TO INFORMATION HANDLING SYSTEMS

BACKGROUND OF THE INVENTION

1. Field of the Invention

The present invention relates in general to the field of maintaining information handling systems, and more particularly to a method and system for targeting alerts to information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system manufacturers build and distribute information handling systems with a wide variety of hardware and software configurations. For instance, consumers often order different configurations of information handling systems to achieve desired price and performance constraints, and software and hardware manufacturers often change components as bugs are fixed and improvements added. In a dynamic manufacturing environment, available information handling system configurations often evolve rapidly with improved performance and greater consumer options for selecting hardware and software components. However, the evolving nature of information handling system configurations increases the difficulty faced by both manufacturers and users in maintaining information handling systems with updated components and software.

In order to aid consumers in maintaining information handling systems up to date, hardware and software component manufacturers often develop improvements and fixes to bugs that are distributed through the Internet. For instance, if a video card manufacturer learns of a driver fault when a video card is used with a particular sound card, the video card manufacturer typically develops an updated driver that fixes the fault and provides the updated driver to information handling system manufacturers for use in newly built information handling systems. In addition, the video card manufacturer and the information handling system manufacturer often post the new driver on the Internet so that users of existing information handling systems are able to download the new driver. However, unless users are made aware of the new driver they often will not download it. Users often learn of an updated driver by calling for technical assistance when the difficulty arises that led to the development of the updated driver, but calls for technical assistance are typically expensive to support. As an alternative, information handling system manufacturers could send alerts to all users each time updated drivers are posted, however, widespread dissemination of alerts results in notification to users who do not use or need the update. Rather than reduce service calls for technical assistance, unnecessary alert notices increase the number of user queries as users attempt to determine which alerts are relevant to their information handling system.

SUMMARY OF THE INVENTION

Therefore a need has arisen for a method and system which targets alerts to information handling systems so that only relevant alerts are displayed at each information handling system.

In accordance with the present invention, a method and system are provided which substantially reduce the disadvantages and problems associated with previous methods and systems for providing alerts to information handling system users. Information handling systems download an alert list and determine the alerts from the alert list that are relevant to the information handling system. The relevant alerts are then downloaded to the information handling system and displayed. An alert of the alert list is found relevant if the information handling system configuration meets configuration parameter conditions associated with the alert in the alert list.

More specifically, each information handling system includes an alert subsystem that contacts an alert server to periodically download an alert list and selected alerts that have conditions met by the information handling system. An alert client periodically queries the alert server with temporal information to download a current alert list. The alert list is an Extensible Mark-up Language (XML) file that associates alerts with conditions so that information handling systems that meet a set of conditions associated with an alert will download and display the alert. An alert targeting engine parses the XML alert list and determines the alerts from the alert list that are targeted to the information handling system by determining the alerts that have conditions that match the configuration parameters of the information handling system. An alert download engine then downloads the relevant alert for display at the information handling system, such as the display of a link for updating component drivers. The conditions of the alert list may include logical expressions of configuration parameter conditions that allow precise targeting of alerts to specific information handling system configurations.

The present invention provides a number of important technical advantages. One example of an important technical advantage is that alerts are targeted to information handling systems based on configuration parameters so that only relevant alerts are displayed at each information handling system. Targeted alerts reach specific information handling systems with timely and relevant information and updates. For instance, specific issues and corrective actions are addressed by identifying conditional configuration parameters related to the issue or corrective action and limiting the display of an alert to information handling systems that meet the alert conditions. As an example, an alert relating to a new driver version for correcting an incompatibility between two specific types of hardware devices will only be displayed on information handling systems having the two types of hardware devices. Restricting the sending of alerts to relevant information handling systems avoids unnecessary disruption to users of unaffected information handling systems and reduces unwanted and unnecessary support inquiries regarding an alert. Further, selecting alerts for download from a list at an information handling system reduces user privacy concerns related to uploading of configuration parameters to a manufacturer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Targeted alerts are provided to information handling systems based on the information handling system configuration parameters so that only relevant alerts are displayed to a user based on the hardware and/or software configuration of the information handling system. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
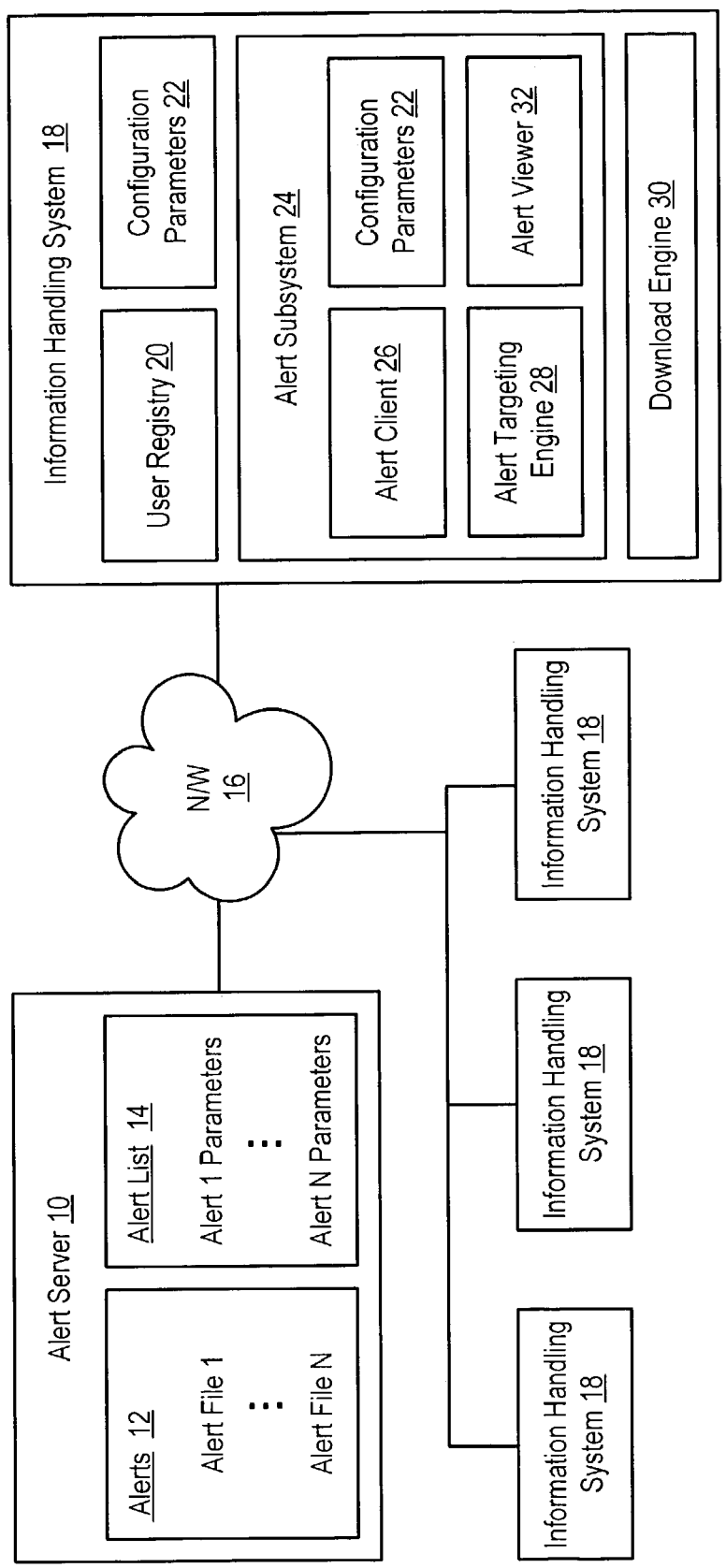
FIG. 1 depicts a block diagram of a system for targeting alerts based on information handling system configuration parameters.

Referring now to FIG. 1, a block diagram depicts a system for targeting alerts based on information handling system configuration parameters. An alert server 10 maintains multiple alert files 12 that each includes graphical display information for displaying an alert at an information handling system. Each alert file 12 is relevant to a defined set of information handling systems with the relevant set of information handling systems determined by a predetermined configuration. The alert files 12 are tracked in an alert list 14 that associates each alert file with information handling system configuration parameters that, if present, generate a condition under which the associated alert becomes relevant to the information handling system user.

Alert list 14 is saved as an Extensible Mark-up Language (XML) file that is updated each time an alert file is added to or deleted from alert server 10. Each configuration parameter is generally characterized in one of seven categories: the line of business of the information handling system, such as the make and model number; operating system type or version; language; country; unique service tag number; and a message identification that provides a temporal reference for the alert. Additional configuration parameters that are associated with an alert file include names and versions for information handling system software applications, hardware devices, peripheral devices and drivers. For alerts that are associated with multiple conditional configuration parameters, the XML statement of alert file 14 combines conditions that associate such alerts with information handling systems as logical expressions. For instance, an alert file 12 that alerts a user of a driver update to fix a predetermined video driver compatibility issue with a predetermined sound card will be associated with a logical expression in alert list 14 that identifies the presence of the predetermined video driver and sound as a condition for display of the alert. The conditioned display of an alert allows very specific targeting of an alert to information handling systems with plural configuration parameters stated as logical expressions. For example, an information handling system targeted for an alert with the expression (vc123 AND sc456 AND NOT bat789) in alert list 14 will download and display the alert only if the information handling system has video card "123" and sound card "456" but does not have battery type "789."

Alert server 10 interfaces through a network 16 with plural information handling systems 18. Each information handling system 18 has configuration parameters that include hardware devices and software operating systems, applications and drivers. Alert server 10 provides alert list 14 as an XML file in response to queries from information handling systems 18 so that alerts are displayed at information handling systems having configuration parameters that match the conditions associated with the displayed alerts by alert list 14. For instance, applying the above example, if an information handling has video card 123 and sound card 456 but does not have a battery of type 789, then the alert or alerts associated in alert list 14 with that condition will display on the information handling system. The alert might, as an example, provide the user of a link for downloading a new video card driver version to correct an incompatibility of video card 123 with sound card 456 that exists unless battery type 789 is in use.

Each information handling system 18 has a user registry 20, a configuration parameters list 22 and an alert subsystem 24 installed as a hidden software module. User registry 20 allows the user to establish settings for alerts, such as the frequency of downloads and even turning off alert subsystem 24. Configuration parameters list 22 identifies the hardware and software configuration parameters of the information handling system, such as with the Window Management Instrumentation (WMI) table that is created within the Windows operating system and helps to keep the configuration parameters up to date as components of the information handling system change. Alert subsystem communicates with alert server 10 through an alert client 26 that periodically queries alert server 10 for alert list 14. In one embodiment, the query from alert client 26 includes temporal information, such as a message ID, that reduces the size of alert list 14 to those alerts added since the most recent query by alert client 26. Alert client 26 provides the downloaded alert list XML file to an alert targeting engine 28, which parses the XML file and evaluates the conditions of the each alert to identify alerts having conditions that are met by the configuration parameters. A list of the alerts that match the configuration parameters are provided to an alert download engine 30 which schedules a download of the matching alert files 12 from alert server 10, such as with a Background Intelligence Transfer Service (BITS). An alert viewer 32 then displays the alerts with the information from the alert files 12 on the information handling system 18 to action by the user of the information handling system.

Figure 2:
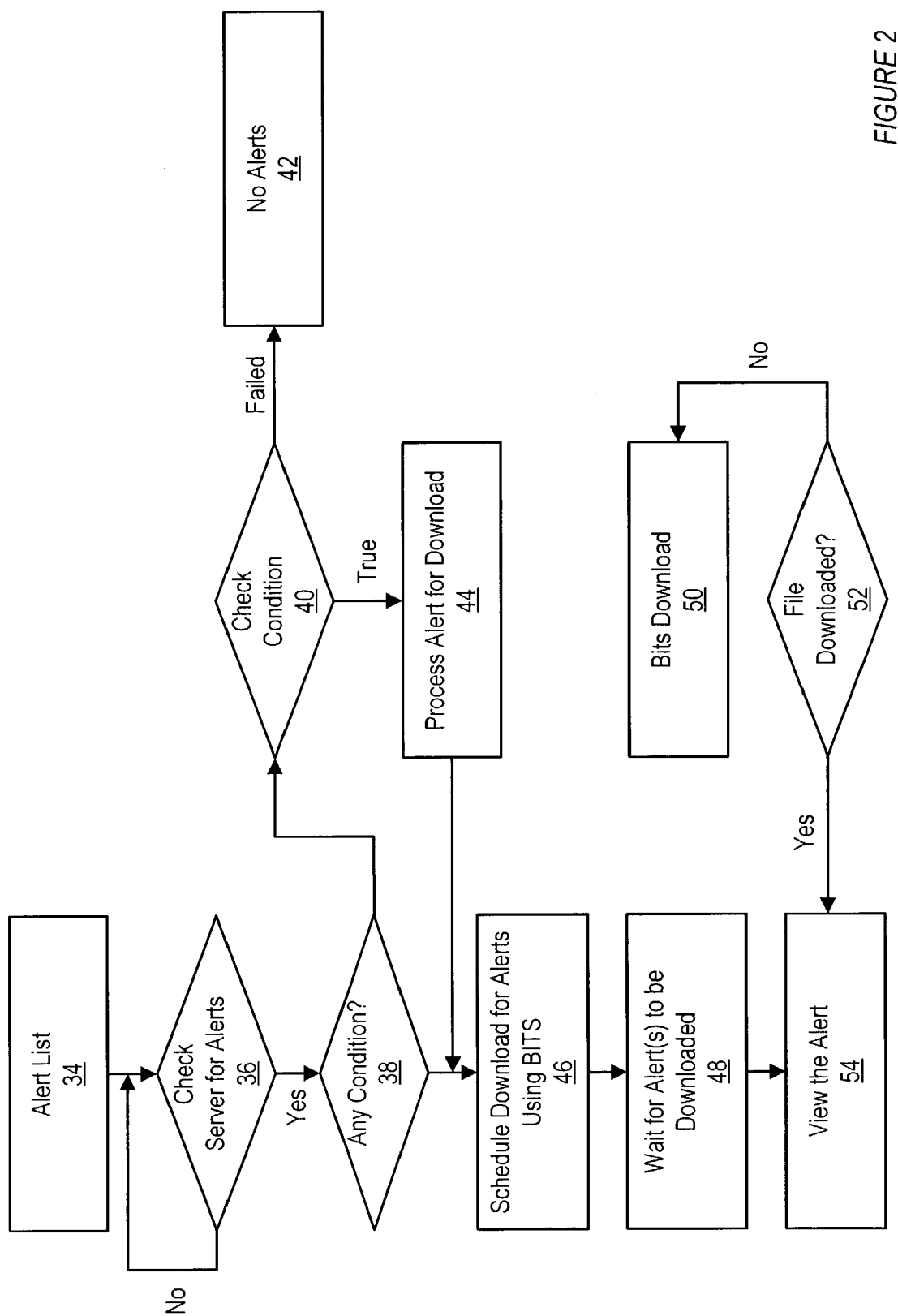
FIG. 2 depicts a flow diagram of a process for targeting alerts based on information handling system configuration parameters.

Referring now to FIG. 2, a flow diagram depicts a process for targeting alerts based on information handling system configuration parameters. The process begins at step 34 with the posting of an alert list accessible to targeted information handling systems, such as posting the XML alert list on an alert server located at a predetermined Internet address. At step 36, information handling systems periodically query the alert server with temporal information, such as a message ID, to determine if the alert list includes one or more alerts added since the information handling systems' most recent query. If no new alerts are present in the alert list, the process periodically returns to step 34 to query the alert server until an alert list is indicated with additional alerts, in which case the alert list is downloaded to the information handling system.

At step 36, the alert subsystem on the information handling system determines if the alerts of the alert list include any conditions. For instance, an alert may issue that lacks conditions and is thus intended for display on each information handling system. If conditions exist for one or more alerts, the process continues to step 40 for a comparison of the condition with the information handling system configuration parameters to determine if the condition for the alert is met at the information handling system. If the condition or conditions are not met for any listed alert, the process continues to step 42 for a determination that no alerts are present and an update to the temporal message ID, and then the process returns to step 36 for periodic queries to the alert server. If a step 40 a condition or conditions associated with an alert or alerts are met, then the process continues to step 44 for processing of the alerts having met conditions to download to the information handling system.

At step 46, the alerts that either lack conditions or have conditions met by the information handling system configuration parameters are scheduled for download from the alert server to the information handling system, such as by using BITS. At step 48, the information handling system waits for download of the alert or alerts which is initiated by a BITS download at step 50 at a scheduled time. At step 52, a determination is made that the alert download is completed and, upon completion of the alert download, the process continues to step 54 for display of the alert to the user of the information handling system. Advantageously, the determination of whether an alert is targeted for the information handling system and the download of relevant alerts is transparent to the user so that the user is informed only when relevant alerts occur. The alert may include corrective action for the user to take, such as downloading a new driver version, with the corrective action specifically targeted to information handling systems having predetermined configuration parameters. Alternatively, the alert download may include the files, such as new driver versions, needed for the user to take corrective action and instructions for the user to take the corrective action, such as by selecting a "GO" icon to initiate installation of the new driver version.

Although the present invention has been described in detail, it should be understood that various changes, substitutions and alterations can be made hereto without departing from the spirit and scope of the invention as defined by the appended claims.

What is claimed is:

1. A system for targeting information handling system alerts based on information handling system configuration parameters, the system comprising:
    an alert server having an alert list and alert files, the alert list associating each alert file with one or more configuration parameters;
    plural information handling systems operable to interface with the alert server, each information handling system storing configuration parameters;
    an alert client installed in each information handling system and operable to query the alert server for the alert list;
    an alert targeting engine installed in each information handling system and interfaced with the alert client, the alert targeting engine operable to determine a match list of alert files by comparing the information handling system configuration parameters with the alert list configuration parameters for each alert file; and
    an alert download engine installed on each information handling system and interfaced with the alert targeting engine, the alert download engine operable to download the alert files of the match list.

2. The system of claim 1 wherein the alert client is further operable to query for the alert list restricted to a desired time period.

3. The system of claim 2 wherein the desired time period comprises a list of alerts generated since a previous query by the alert client.

4. The system of claim 1 wherein the information handling system stores the configuration parameters in a Windows Management Interface table.

5. The system of claim 1 wherein the alert targeting engine is further operable to conditionally match configuration parameters.

6. The system of claim 1 wherein the alert list comprises an Extensible Mark-up Language file.

7. The system of claim 1 further comprising an alert viewer installed on each information handling system and interfaced with the alert download engine, the alert viewer operable to display downloaded alerts at the information handling system.

8. A method for targeting information handling system alerts sent to an information handling system based on information handling system configuration parameters, the method comprising:
    posting at a network location an alert having one or more configuration parameter conditions;
    automatically querying from the information handling system to the network location to obtain the ant or more alert configuration parameter conditions;
    comparing at the information handling system the alert configuration parameter conditions with the information handling system configuration parameters to determine a match; and
    downloading the alert to the information handling system.

9. The method of claim 8 wherein automatically querying further comprises downloading an Extensible Mark-up Language file having one or more alerts, each alert having associated configuration parameter conditions.

10. The method of claim 8 further comprising:
    scheduling the download of the alert with a Background Intelligence Transfer Service.

11. The method of claim 8 further comprising:
    displaying the alert at the information handling system.

12. The method of claim 8 further comprising:
defining the alert configuration parameter conditions as a logical expression combining plural configuration parameters.

13. The method of claim 12 wherein combined plural configuration parameters comprise video and audio hardware devices.

14. The method of claim 8 wherein the configuration parameters comprise one or more of the information handling system operating system, identification service tag number, model, language, country and message identification for most recent previous query.

15. The method of claim 8 wherein the information handling system stores the configuration parameters in the Windows Management Instrumentation table.

16. An information handling system comprising:
an alert client operable to query an alert server for an alert list having one or more alerts, each alert having one or more configuration parameters;
a configuration parameter file storing configuration parameters of the information handling system;
an alert targeting engine interfaced with the alert client and operable to compare the information handling system configuration parameters with the alert list configuration parameters for each alert and to identify alerts having configuration parameters that match the information handling system configuration parameters; and
an alert download engine interfaced with the alert targeting engine and operable to download the alerts having configuration parameters that match the information handling system configuration parameters.

17. The information handling system of claim 16 wherein one or more of the alert configuration parameters comprise a logical expression of plural hardware and/or software components.

18. The information handling system of claim 16 further comprising an alert viewer operable to display a downloaded alert at the information handling system, the alert comprising instructions relating to updates for the information handling system.

19. The information handling system of claim 16 wherein the configuration parameter file comprises the Windows Management Interface Table.

20. The method of claim 16 wherein the alert list comprises an Extensible Mark-up Language file.

* * * * *